United States Patent [19]

Seto

[11] Patent Number: 4,575,231

[45] Date of Patent: Mar. 11, 1986

[54] POSITIONING DEVICE FOR MOUNTED FILM

[75] Inventor: Yasuhiro Seto, Kanagawa, Japan

[73] Assignee: Fuji Photo Film Co., Ltd., Kanagawa, Japan

[21] Appl. No.: 587,894

[22] Filed: Mar. 9, 1984

[30] Foreign Application Priority Data

Mar. 9, 1983 [JP] Japan ............................. 58-33918[U]

[51] Int. Cl.[4] ...................... G03B 27/62; G03B 27/64
[52] U.S. Cl. .......................................... 355/76; 353/95
[58] Field of Search ................. 355/75, 76, 79, 55, 355/122; 352/221, 222, 223, 224, 225; 353/95, 96, 69, 23, 104

[56] References Cited

U.S. PATENT DOCUMENTS 3,457,009  7/1969  Landesman ..................... 353/23

OTHER PUBLICATIONS

Fuji, Automatic Printer, FAP 3500H
Fuji, Color Roll Printer, 8C6910, 8C6910II and 5C69710.

Primary Examiner—L. T. Hix
Assistant Examiner—Brian W. Brown
Attorney, Agent, or Firm—Wenderoth, Lind & Ponack

[57] ABSTRACT

A device for positioning a film set to a mount in an image printing apparatus comprises several elements. A movable member moves the mount in a direction parallel to a light axis of an optical printing system. A film positioning member, made of a light permeable material, is secured to a casing at a position between the film set in the mount and a light source for setting a film reference position in the optical printing system. Thus, the film is intimately contacted by the film positioning member at the film reference position when the movable member is moved towards the film positioning member during an image printing operation of the apparatus.

4 Claims, 5 Drawing Figures

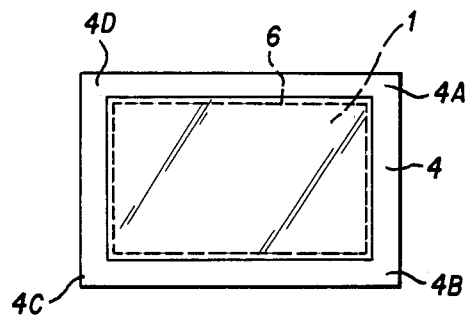
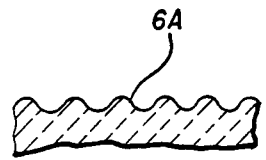
FIG. 2
FIG. 3
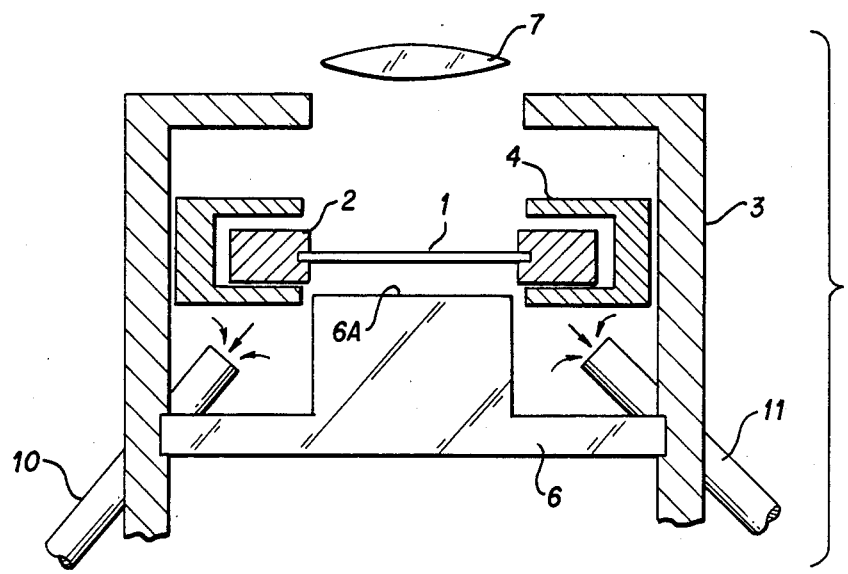
FIG. 4

POSITIONING DEVICE FOR MOUNTED FILM

BACKGROUND OF THE INVENTION

1. Field of the Invention

The present device relates to a positioning device for film mounted in an apparatus which prints an image on the film set to a mount on a photographic printing paper.

2. Description of the Prior Art

Generally, in the case of printing an image formed on a film set to a mount, it is always required to position the film to a certain reference position in an optical printing system, i.e., a position at which, when the film is set, the image on the film can accurately be focused on a photographic printing paper. However, actually, the mounts for the films which are produced by various makers or firms in this art field are different in their thicknesses, respectively, and therefore, the mounts are usually classified into approximately three groups in accordance with their thicknesses. In addition, mount holders to be used also had to be changed everytime when a mount in a different group was used to obviate fuzz or blur of the focused image on a printing paper. In fact, however, it is almost impossible to effect accurate positioning of films in prior art optical printing systems by roughly classifying the mounts, which generally have a wide thickness range of about 1–3.2 mm, only into three groups. Thus, it is considerably hard to completely obviate the fuzz of the focused image on the printing paper. In addition, in a conventional film positioning method, adjustment of curls appearing on the film or reorientation of the film set incorrectly to the mount in an inclined manner cannot be performed.

SUMMARY OF THE INVENTION

The present invention obviates defects or disadvantages of a film setting device of the prior art described above. According to the present invention, the rear surface of the film is always placed at a predetermined position at a constant level without fixing the mount. Thus, an accurately focused image can be formed and printed on printing paper. Moreover, the mounted film can be intimately in contact with the upper surface of the film positioning member which is secured to the casing of the present invention, so that the flatness of the film on the film positioning member can always be kept the same at the time of printing and the curls in the film or the inclination thereof can also be easily adjusted. These adjustments can be realized regardless of the thickness of the mount to be used.

BRIEF DESCRIPTION OF THE DRAWINGS

FIG. 2 is a plan view briefly showing a positional relationship between the film and the film positioning member of the present invention as shown in FIGS. 1A or 1B;

FIG. 3 shows a vertical section of the upper surface of the film positioning member; and FIG. 4 is a vertical sectional view showing another embodiment, similar to FIG. 1A, according to the present invention.

DETAILED DESCRIPTION OF THE PREFERRED EMBODIMENTS

Figure 1A:
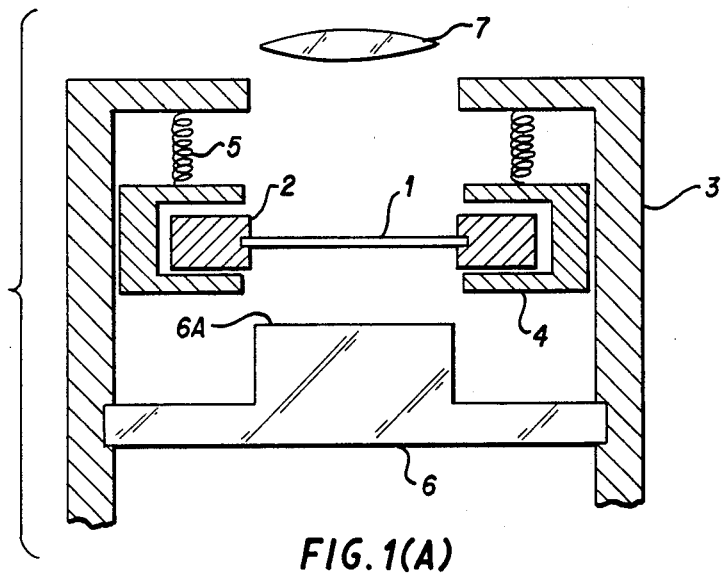
FIGS. 1A and 1B are vertical sectional views showing the positional relationship of constructional members of one embodiment according to the present invention.
Figure 1B:
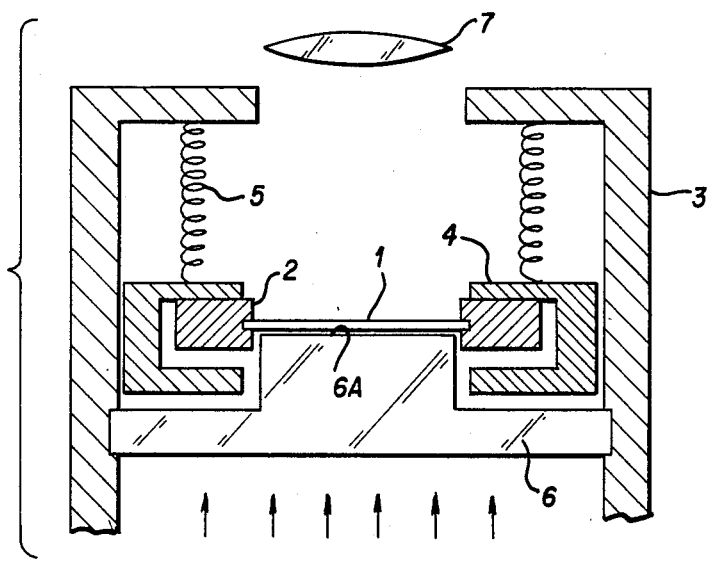

FIGS. 1A and 1B show one embodiment of a film positioning device according to the present invention, in which a mount 2 supporting a fitted film 1 is set in a member 4 which is movable vertically within a casing 3 and suspended from the inner surface of an upper plate of the casing 3 by spring members 5. Although the movable member 4 is mechanically stopped at a proper position in the casing 3 by stopping member (not shown) so as not to lower the movable member 4 any farther before or after printing, at printing time, the movable member 4 disengages from the stopping member and lowers the film mount 2 because of the resiliency possessed by the spring members 5.

A film positioning member 6 made of light permeable material, such as glass, transparent polyvinylchloride, or acryl resin, is secured in and to the casing 3 at a position below the film 1 which is supported by the mount 2 for setting a film reference position in the optical printing system. The film positioning member 6 is provided with a protruded central portion 6A directly below the film 1 so that the film 1 can come closely into contact with the upper surface of the protruded central portion 6A at a time when the movable member 4 lowers itself in the casing 3. A focusing lens 7 is disposed directly above the film 1. Through an opening provided for the upper plate of the casing 3 so that the light from a light source (not shown) located below the light permeable film positioning member 6 can be focused on a photographic printing paper (not shown) through the film positioning member 6, the mounted film 1 and the focusing lens 7 form the image of the film on the printing paper.

The protruded central portion 6A of the film positioning member 6 is provided with an upper surface having an area slightly smaller than the whole surface area of the mounted film 1, thereby allowing the intimate contact of the surface of the film 1 with the whole upper surface of the protruded portion 6A of the film positioning member 6, as shown in FIG. 2. The movable member 4 has a rectangular cross-section which is similar to that of the mounted film 1 and the spring members 5 can be attached to the corner portions 4A through 4D of the movable member 4, for example, as shown in FIG. 2. The upper surface of the protruded portion 6A of the film positioning member 6 is slightly roughly finished as shown in FIG. 3 to the extent that Newton's ring is not formed on the film 1 when the film 1 is intimately contacted with the upper surface of the protruded portion 6A at printing time.

An actual operation of the apparatus uses such a construction as described above. After the film 1 has been fitted in the mount 2, which has then been set in the movable member 4, the movable member 4 is engaged with the stopping member as shown in FIG. 1 in the suspended condition by the spring members 5 in the casing 3. When it is required to print an image of the film on the printing paper, the movable member 4 is disengaged from the stopping member, and at this moment, the movable member 4 with the mounted film 1 supported therein starts to lower itself due to the resiliency possessed by the spring members 5. The lowering movement of the movable member 4 ends at a time when the film 1 set in the mount 2 contacts intimately the upper surface of the protruded central portion 6A of the film positioning member 6. Accordingly, since the film positioning member 6 is secured to the casing 3, the level of the upper surface of the protruded central portion 6A always keeps a constant stationary position, i.e. the film reference position of the optical printing system. Thus, the position of the mounted film 1 has been always kept at a predetermined level after intimate contact with the upper surface of the protruded portion 6A. In other words, the mounted film 1 with the movable member 4 can be lowered onto the upper surface of the protruded portion 6A of the stationary film positioning member 6, which has always a predetermined positional level, even if various types of mounts having different thicknesses are used.

Under these conditions, when light is projected from the light source located below the film positioning member 6, the image formed on the mounted film 1 can always be focused and printed on the printing paper regardless of the type of mount 2 to be used. In addition, since the film positioning member 6 is made of a light permeable material and the central portion 6A thereof protrudes in parallel with the axis of the light projected from the light source, the deformation and the uneven density of the image printed on the printing paper can substantially be obviated. The device shown in FIGS. 1A or 1B is, of course, provided with a mechanism for moving upwardly the movable member 4 from the position shown in FIG. 1B to the position shown in FIG. 1A after the completion of the printing operation, but the mechanism is now eliminated in the accompanying drawings for the sake of convenience.

In the embodiment described above, although the spring members 5 are connected at both ends to the upper plate of the casing 3 and the upper surface of the movable member 4, tension springs may be alternatively disposed between the rear surface of the movable member 4 and the film positioning member 6. In both cases, portions to which the springs are to be connected can optionally be selected without defining positions such as shown in FIG. 2.

FIG. 4 shows another embodiment of the film positioning device according to the present invention, in which like reference numerals are added to members corresponding to those shown in FIGS. 1 through 3 and in which a pressure-reducing device, for example, a vacuum pump having suction nozzles 10 and 11, is utilized instead of the spring members 5 used in the former embodiment of the present device. The vacuum pump, i.e. the suction nozzles 10 and 11 thereof, is located at a position suitable for reducing the pressure in the space defined between the movable member 4 and the film positioning member 6 in the casing 3 to thereby lower the movable member 6 at printing time and to realize the intimate contact of the mounted film 1 with the upper surface of the protruded portion 6A of the film positioning member 6, thus accurately positioning the film 1 set in the mount 2 at the predetermined level of the stationary protruded central portion 6A. According to this embodiment, since the mounted film 1 settled on the protruded central portion 6A is successively subjected to suction pressure by the vacuum pump, the mounted film 1 is fully pulled to realize the intimate contact of the film 1 to the upper surface of the protruded central portion 6A of the film positioning member 6 even in a case where the film is adversely curled or undulated or where the film 1 is set to the mount 2 in an inclined manner. In this embodiment, although there is also provided a mechanism for returning the movable member 4 to a position where the movable member 4 is engaged with a stopping member (not shown), the mechanism is now eliminated in FIG. 4. In another example of this embodiment, a pressure applying means may be located at a portion in the casing 3 suitable for pressing the film 1 to the mount 2 towards the upper surface of the protruded central portion 6A of the film positioning member 6.

In a further embodiment according to the present invention, but not mentioned in detail herein, spring members 5 shown in FIG. 1A or 1B and a vacuum pump shown in FIG. 4 may be used in a combined form as a mechanism for actuating the movable member 4. Moreover, in the illustrated embodiment described hereinabove, the focusing lens 7, the mounted film 1, and the film positioning member 6 of the present invention are arranged vertically above each other as viewed from the upper to the lower portion of the drawings, but the arrangement of these members is not limited to this form and the reverse arrangement or the horizontal arrangement thereof may be used instead.

I claim:

1. A device for positioning a film in an apparatus which projects an image of the film, said device comprising:
    a casing having an upper plate with an inner surface, a lower end, and an aperture extending through the upper plate;
    a light permeable positioning member secured in and to the casing at the lower end thereof, said light permeable positioning member having a central portion protruding toward the aperture in the upper plate of the casing;
    a member movable between the inner surface of the upper plate of the casing and the positioning member;
    means, arranged in the casing, for moving the movable member vertically between the inner surface of the upper plate of the casing and the positioning member;
    means, set in the movable member, for mounting the film therein;
    source means, arranged below the positioning member, for projecting light through the film;
    a lens means, disposed outside of the casing above the aperture in the upper plate, for focusing an image on the film through which light is projected by the source means;
    whereby an accurately focused image can always be formed by focusing lens means regardless of the thickness of the mounting means to be used.
2. The device according to claim 1 wherein:
    said moving means is a plurality of springs attached to the inner surface of the upper plate of the casing.
3. The device according to claim 1 wherein:
    said moving means is a vacuum pump having a plurality of suction nozzles positioned between the movable member and the positioning member in the lower end of the casing.
4. The device according to claim 1 wherein: p1 said central portion of the positioning member has a rough upper surface.

* * * * *